US012750081B2

(12) United States Patent
Wang et al.

(10) Patent No.: US 12,750,081 B2
(45) Date of Patent: Sep. 29, 2026

(54) MODULAR INDIVIDUALIZED PHONE CASE

(71) Applicant: Weiyin Wang, Beijing (CN)

(72) Inventors: Weiyin Wang, Beijing (CN); Shangze Lyu, Beijing (CN)

(73) Assignee: Weiyin Wang, Beijing (CN)

( * ) Notice: Subject to any disclaimer, the term of this patent is extended or adjusted under 35 U.S.C. 154(b) by 267 days.

(21) Appl. No.: 18/617,653

(22) Filed: Mar. 27, 2024

(65) Prior Publication Data

US 2025/0253881 A1 Aug. 7, 2025

(30) Foreign Application Priority Data

Feb. 4, 2024 (CN) ......................... 202420274128.6

(51) Int. Cl.
*H04B 1/3888* (2015.01)
*H04M 1/04* (2006.01)

(52) U.S. Cl.
CPC ............ *H04B 1/3888* (2013.01); *H04M 1/04* (2013.01)

(58) Field of Classification Search
CPC .... H04B 1/3888; H04M 1/04; H04M 1/0249; H04M 1/0203; H04M 1/0283; A45C 13/001; A45C 15/00; A45C 13/00; A45C 11/002; A45C 11/00; A45C 13/1069
See application file for complete search history.

(56) References Cited

U.S. PATENT DOCUMENTS

| | | | | |
|---|---|---|---|---|
| 9,008,738 B1 * | 4/2015 | Dong | .................... | H04M 1/185 455/575.8 |
| 9,894,938 B2 | 2/2018 | Vick et al. | | |
| 10,116,776 B2 | 10/2018 | Jannard | | |
| 10,439,408 B1 | 10/2019 | Bastiyali | | |
| 2006/0188668 A1 | 8/2006 | Wahba | | |
| 2014/0049851 A1 * | 2/2014 | Snell | .................... | F16M 11/041 248/688 |
| 2015/0111623 A1 * | 4/2015 | Hegemier | ........... | H04M 1/0254 455/575.1 |
| 2017/0026498 A1 * | 1/2017 | Goldfain | ................ | A45C 11/00 |
| 2018/0344004 A1 * | 12/2018 | Kim | ....................... | A45D 33/26 |

(Continued)

FOREIGN PATENT DOCUMENTS

| | | |
|---|---|---|
| CN | 203608245 U | 5/2014 |
| CN | 210174194 U | 4/2020 |

(Continued)

*Primary Examiner* — Md K Talukder

(57) ABSTRACT

A modular individualized phone case includes a case body, a back plate and a modular modeling component. The back plate is detachably arranged in the case body, the back plate is a ferromagnetic metal plate, and the modular modeling component is attracted and fixed onto a rear side surface of the back plate. The modular modeling component includes multiple modeling modules which can be combined to form different looks. The modeling modules are magnetic attraction sheets. The modeling modules are attracted on the rear side of the back plate and combined to form individualized designs, and then the back plate is put into the case body. The modeling modules of the individualized design can be exhibited through the transparent case body. As such, various different rear-view looks (depending on the number of modeling modules, the more the number is, the more diverse the overall look is) can be obtained.

5 Claims, 15 Drawing Sheets

(56) References Cited

U.S. PATENT DOCUMENTS

| | | | | |
|---|---|---|---|---|
| 2024/0125343 | A1* | 4/2024 | McCullough | H04M 1/0254 |
| 2025/0253881 | A1* | 8/2025 | Wang | A45C 11/002 |

FOREIGN PATENT DOCUMENTS

| | | | | | |
|---|---|---|---|---|---|
| JP | S58187327 | U | | 12/1983 | |
| KR | 200321574 | Y1 | | 7/2003 | |
| KR | 20130001364 | U | * | 2/2013 | A45C 13/002 |

* cited by examiner

MODULAR INDIVIDUALIZED PHONE CASE

CROSS-REFERENCE TO RELATED APPLICATIONS

This application claims priority to Chinese Patent Application No. 202420274128.6, with a filing date of Feb. 4, 2024. The content of the aforementioned application, including any intervening amendments thereto, is incorporated herein by reference.

FIELD

The present application relates to the technical field of phone accessories, and in particular to a modular individualized phone case.

BACKGROUND

A phone case can protect a phone, and has functions such as anti-falling, anti-scratching, waterproof and anti-shock. With the increasing emphasis on fashion in the appearance design of an industrial product, the decorative function of the phone case has become more and more prominent. The existing phone case is the product of industrial mass production. Although there are many styles, they cannot meet the needs of modern people for showcasing individuality and pursuing uniqueness.

SUMMARY

In view of the above problem, a modular individualized phone case is provided to solve the technical problem that the existing phone case cannot meet the needs of people for showcasing individuality and pursuing uniqueness.

In order to achieve the above object, the following technical solutions are provided according to the present application.

A modular individualized phone case includes a case body, a back plate and a modular modeling component. The back plate is detachably arranged in the case body, the back plate is a ferromagnetic metal plate, and the modular modeling component is attracted and fixed onto a rear side surface of the back plate. The modular modeling component includes multiple modeling modules which are combined to form different looks. The modeling modules are magnetic attraction sheets.

The modeling modules are attracted on the rear side of the back plate and combined to form individualized designs, and then the back plate is put into the case body. The modeling modules of the individualized design can be exhibited through the transparent case body. As such, various different rear-view looks (depending on the number of modeling modules, the more the number is, the more diverse the overall look is) can be obtained, which can meet the needs of people for showcasing individuality and pursuing uniqueness.

Further, the case body is a flip case body, which includes an outer case and an inner case. The outer case is a transparent case, and the inner case is arranged inside the outer case. A side of the inner case is pivotally connected to a same side of the outer case by a rotating shaft. A front side of a bottom plate of the outer case is provided with an elastic pressing column. The back plate is arranged in an interlayer between the outer case and the inner case and is pressed against a rear side of the inner case by the pressing column. The modeling modules are located between the back plate and the outer case.

The multiple modeling modules are attracted on the rear side of the back plate for individualized design, the back plate with individualized design is put into the inner case, then the outer case is closed, and the back plate is fixed in the interlayer between the inner case and the outer case by the pressing column of the outer case, so that the modeling modules of the individualized design can be exhibited through the transparent outer case.

Further, both the outer case and the inner case are transparent plastic cases, which have good shock absorption effect on the one hand and facilitate overall processing on the other hand. A pair of magnetic attraction structures is arranged on a side of the outer case and a side of the inner case opposite to the rotating shaft, so that the outer case can be opened and closed more conveniently, which extremely facilitates replacing the back plate (mainly for changing the look of the rear side of the back plate). The pair of magnetic attraction structures is a magnetic strip and an iron strip, the magnetic strip is arranged on one of the outer case and the inner case, and the iron strip is arranged on the other of the outer case and the inner case, and the magnetic strip is opposite in position to the iron strip. The strip-shaped (the magnetic strip and the iron strip are strip-shaped) magnetic attraction structures do not affect the aesthetics of a side surface of the phone case. The number of the pressing column is four, and the four pressing columns are distributed at four corners of the outer case, so that the back plate is fixed more stably. The pressing columns are elastic telescopic columns, which can adapt to the back plate of a different thickness.

Further, the modeling modules include multiple figure modeling sub-modules which are configured to be combined into human-like figures, multiple clothing modeling sub-modules which are configured to dress the human-like figures, and multiple decoration sub-modules which are configured to decorate the human-like figures; or, the modeling modules include multiple two-dimensional geometric sub-modules, which have shapes such as circles, regular polygons (equilateral triangles, squares, regular hexagons), jigsaw puzzles, and Tetris blocks. The look can be designed freely according to personal preferences, so as to better showcase individuality.

Further, the case body is a one-piece case body, an elastic bracket is provided in the case body, one end of the bracket is connected with a side of the case body, and the other end is parallel to a bottom plate of the case body and extends inward. When the phone case is fixed to a phone, the back plate is clamped between the bracket and the phone, and the modeling modules are located between the back plate and the bottom plate of the case body. The one-piece case body can be formed by mature injection molding, with a simple structure and a low cost. A second type of case body is provided, which increases the options of the user.

Further, the number of the bracket is four, and the four brackets are distributed at four corners of the case body, which can fix the back plate more stably.

Further, the case body is a slide case body, which includes a case main body and a sliding cover. Two T-shaped sliding rails which are parallel to each other and spaced apart are provided on a rear side of the case main body. A sliding groove adapted to the T-shaped sliding rail is defined on each of two sides of the sliding cover. The back plate is clamped between the two T-shaped sliding rails and is located in a cavity between the case main body and the sliding cover. A third type of case body is provided, which increases the options of the user.

Further, each of the case main body, the sliding cover and the back plate is provided with a window corresponding to a phone camera in position. An integrally formed annular sealing member is arranged at the window of the sliding cover. When the sliding cover and the back plate are mounted on the case main body, the other end of the annular sealing member seals the window of the case main body, so as to prevent dust and the like from entering the interlayer, and enable the camera to work normally without obstruction. A locking structure is provided between each T-shaped sliding rail and the corresponding sliding groove. For example, a recess is defined on the T-shaped sliding rail, and a corresponding protrusion is provided at an edge of the sliding groove. Alternatively, a recess is defined at an edge of the sliding groove, and a corresponding protrusion is provided on the T-shaped sliding rail. When the sliding cover slides in place with respect to the case main body, the locking structure is just locked, so as to prevent the sliding cover from disengaging and falling off from the case main body.

Further, the case body is a snap-on case body, which includes a case main body and a snap-on cover. A mounting cavity is defined on a rear side of the case main body, and a clamping groove is defined on a side portion of the mounting cavity. A hook which extends forward and is adapted to the clamping groove is provided at an edge of the snap-on cover. The back plate is arranged in the mounting cavity, and the back plate is pressed against the bottom of the mounting cavity by the top of the hook. A fourth type of case body is provided, which increases the options of the user.

Further, two clamping grooves are defined on each of a left side and a right side of the mounting cavity, two hooks are provided on each of two sides of the snap-on cover, and the four hooks are in one-to-one correspondence with the four clamping grooves, so that the fixing effect is better. Each of the case main body, the snap-on cover and the back plate is provided with a window corresponding to a phone camera in position. An integrally formed annular sealing member is arranged at the window of the snap-on cover. When the snap-on cover and the back plate are mounted on the case main body, the other end of the annular sealing member seals the window of the case main body, so as to prevent dust and the like from entering the interlayer, and enable the camera to work normally without obstruction.

The present application has the following advantages.

The modular individualized phone case according to the present application is provided with the detachable back plate inside the case body, which can attract and fix modeling modules. Since the modeling modules can be combined to form different looks, different modeling modules can be attracted on the back plate to form an individualized look, so that the look of the back of the phone case has the properties of independent design, variability and the like, and can meet the needs of people for showcasing individuality and pursuing uniqueness.

BRIEF DESCRIPTION OF THE DRAWINGS

In order to illustrate solutions of the embodiments of the present application or in the conventional technology more clearly, the drawings used in the description of the embodiments or of the conventional technology are briefly described below. It is apparent that the drawings in the following description are only exemplary. For those of ordinary skill in the art, other implementation drawings can be derived from the provided drawings without any creative work.

The structure, proportion, and size shown in the drawings of the specification are only used to match the contents disclosed in the specification for those skilled in the art to understand and read and are not intend to limit the conditions under which the present application can be implemented, having no technically significance. Any modification of structure, change of proportional relationship, or adjustment of size should still fall within the scope of the technical content disclosed in the present application without affecting the efficacy and purpose of the present application.

Figure 1:
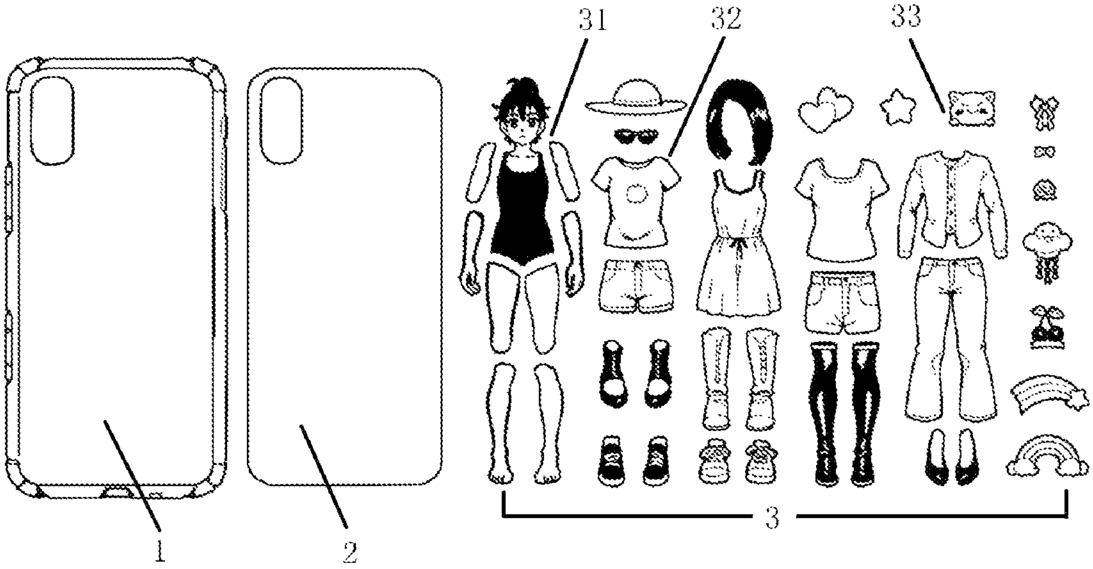
FIG. 1 is a schematic view of components of a modular individualized phone case in a first embodiment.
Figure 2:
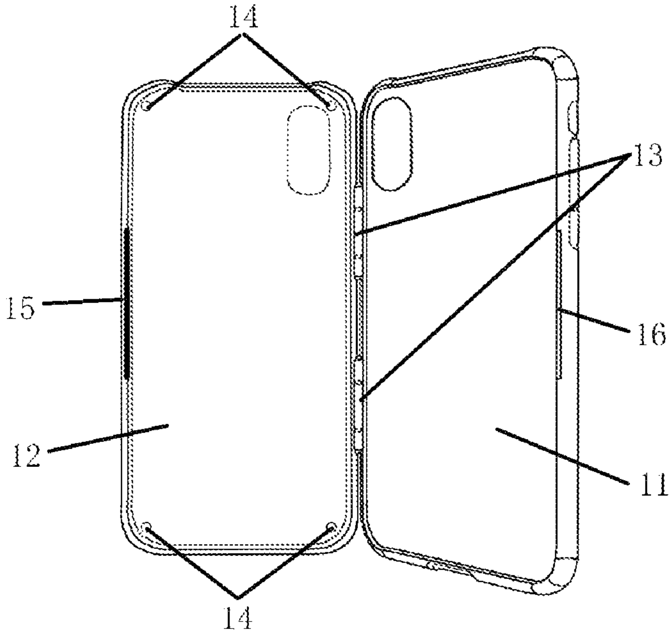
FIG. 2 is a schematic structural view of a case body of the modular individualized phone case in the first embodiment.
Figure 3:
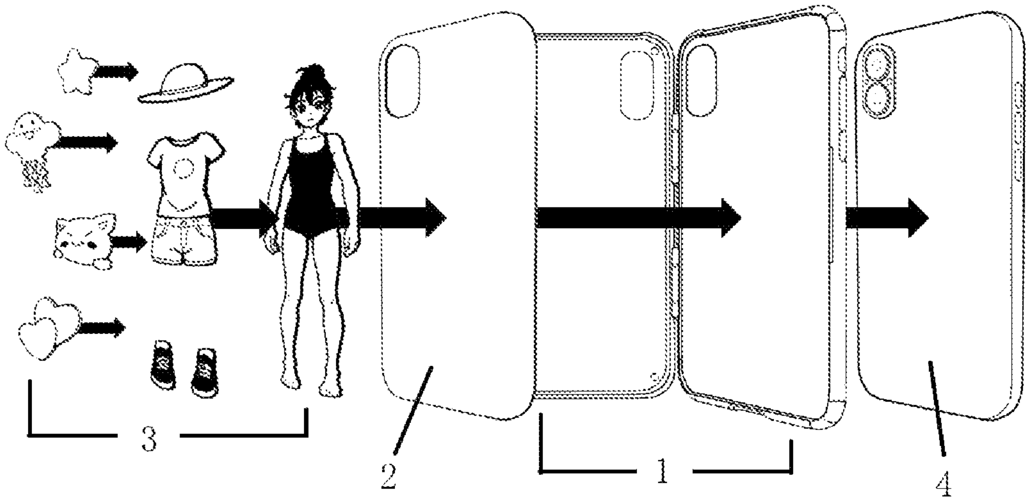
FIG. 3 is a schematic view showing an assembly process of the modular individualized phone case in the first embodiment.
Figure 4:
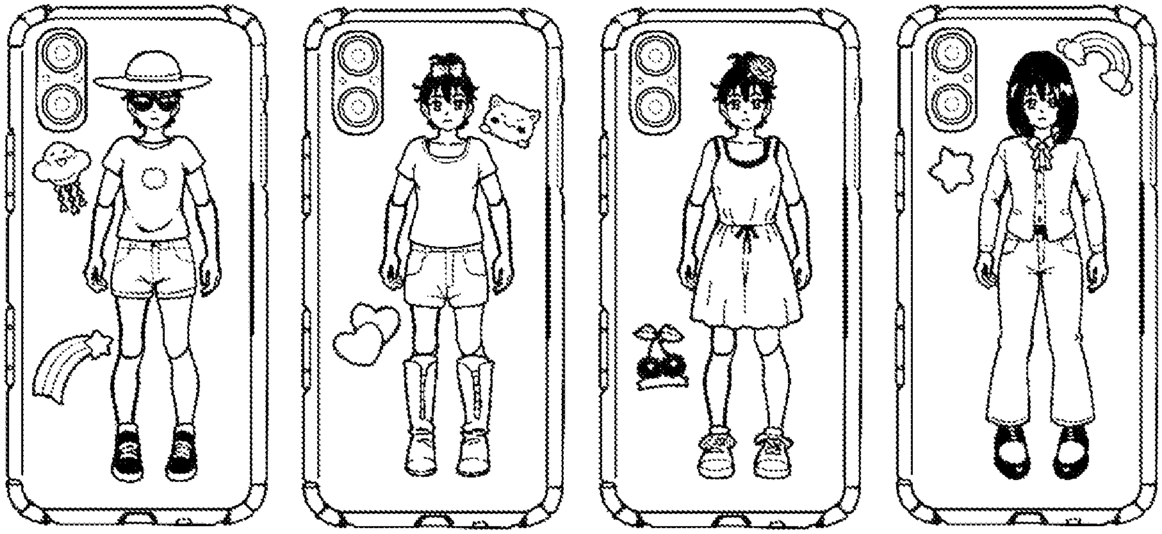
FIG. 4 is a schematic view showing four assembly effects of the modular individualized phone case in the first embodiment using figure modeling sub-modules, clothing modeling sub-modules, and decoration sub-modules.
Figure 5:
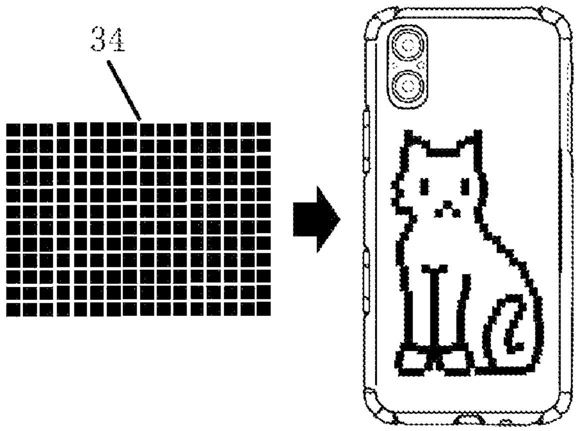
FIG. 5 is a schematic view showing an assembly effect of the modular individualized phone case in the first embodiment using two-dimensional geometric sub-modules.
Figure 6:
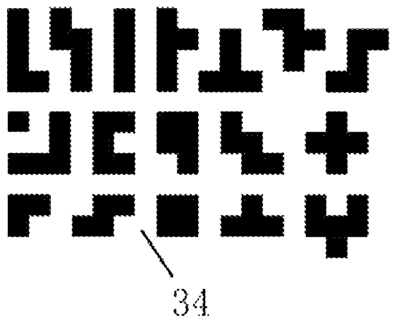
FIG. 6 is a schematic view showing a modular modeling component of the modular individualized phone case in the first embodiment, wherein the modular modeling component is composed of two-dimensional geometric sub-modules in the form of Tetris blocks.
Figure 7:
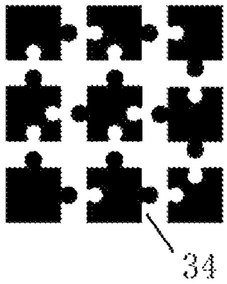
FIG. 7 is a schematic view showing the modular modeling component of the modular individualized phone case in the first embodiment, wherein the modular modeling component is composed of two-dimensional geometric sub-modules in the form of jigsaw puzzles.

Reference numerals in the drawings are listed as follows: 1 case body, 11 inner case, 12 outer case, 13 rotating shaft, 14 pressing column, 15 magnetic strip, 16 iron strip, 17 bracket, 18 case main body, 19 sliding cover, 120

T-shaped sliding rail, 121 sliding groove, 122 annular sealing member, 123 recess, 124 protrusion, 125 snap-on cover, 126 clamping groove, 127 hook, 128 button, 129 guiding structure;

2 back plate;

3 modular modeling component, 31 figure modeling sub-module; 32 clothing modeling sub-module, 33 decoration sub-module, 34 two-dimensional geometric sub-module;

4 phone.

DETAILED DESCRIPTION OF THE EMBODIMENTS

The embodiments of the present application are illustrated below by the specific examples. Those skilled in the art can readily understand other advantages and effects of the present application from the contents disclosed in this specification. It is apparent that the described embodiments are only some rather than all of the embodiments of the present application. Based on the embodiments of the present application, all other embodiments obtained by those having ordinary skill in the art without creative work shall fall within the protection scope of the present application.

Terms such as "upper", "lower", "left", "right" and "middle" quoted in this specification are only for ease and explicitness of description, and are not used to limit the applicable scope of the present application. Variants in which the relative relationship is altered or adjusted without substantively changing the technical content shall still be deemed to fall in the applicable scope of the present application.

First Embodiment

As shown in FIG. 1 to FIG. 7, a modular individualized phone case is provided in a first embodiment, which includes a case body 1, a back plate 2 and a modular modeling component 3. The case body 1 includes an outer case 12 and an inner case 11. The outer case 12 is a transparent case, and the inner case 11 is arranged inside the outer case 12. A side of the inner case 11 is pivotally connected to a same side of the outer case 12 by two rotating shafts 13. A side, facing toward the inner case 11, of the outer case 12 is provided with a pressing column 14. The back plate 2 is arranged in an interlayer between the outer case 12 and the inner case 11, and is pressed against a side, facing toward the outer case 12, of the inner case 11 by the pressing column 14. The modular modeling component 3 is attracted and fixed onto a plate surface of the back plate 2, and the modular modeling component 3 is located between the back plate 2 and the outer case 12. The modular modeling component 3 includes multiple modeling modules which can be combined to form different looks.

The modeling modules are attracted on a rear side of the back plate 2 for individualized design, the back plate 2 is then put into the inner case 11, and then the outer case 12 is closed (the inner case 11 rotates relative to the outer case 12 around the rotating shafts 13, and finally the two cases are nested together). The back plate 2 is fixed in the interlayer between the inner case 11 and the outer case 12 by the pressing column 14 of the outer case 12. The modeling modules of the individualized design can be exhibited through the transparent outer case 12. As such, various different rear-view looks (depending on the number of modeling modules, the more the number is, the more diverse the overall look is) can be obtained, which can meet the needs of people for showcasing individuality and pursuing uniqueness, and enable people with common hobbies to find each other quickly.

In this embodiment, the modeling modules include multiple figure modeling sub-modules 31 which are configured to be combined into human-like figures (such as head, trunk, thighs, calves and feet, upper arms, forearms and hands), multiple clothing modeling sub-modules 32 (such as hats, glasses, T-shirts, shorts, long boots, ankle boots, board shoes, high-top shoes, stockings, socks, jackets, and trousers) which are configured to dress the human-like figures, and multiple decoration sub-modules 33 (such as red hearts, stars, cats, and rainbows) which are configured to decorate the human-like figures. The human-like figures can be replaced by animal figures or cartoon figures. Alternatively, the modeling modules include multiple two-dimensional geometric sub-modules 34 which have shapes such as circles, regular polygons (such as equilateral triangles, squares, and regular hexagons), jigsaw puzzles, and Tetris blocks. Although the two-dimensional geometric sub-modules 34 do not have a more specific image than the pre-designed figure modeling sub-modules 31 and clothing modeling sub-modules 32, the modeling modules in such form can give the user more freedom to design mosaic arts with great creativity and artistic tension. The color and size (even the material) of the two-dimensional geometric sub-modules 34 can be various, which also give the user more creative possibilities.

Various shapes are printed on the front surface of the modeling module, such as characters, clothes, equipment, ornaments, pets, special effects and so on. The user can choose his/her favorite character, pose the character in unique poses (the limbs of the character can also be divided into modules, which can be combined freely), and then attract the clothing components to the limbs of the character (in some designs, the clothing components can be directly used to replace the limb components), so that the user can create his/her own unique look combination. It can be predicted (referring to what can be realized by the existing technology or future technology) that, special effects can also be added to the look (visual effects such as light, wave, electricity and flame simulated by transparent, translucent or fluorescent materials are also magnetically attracted on the back plate).

It should be noted that the present application is not an industrial design patent, and all the looks of characters, clothes and ornaments appearing in this patent are design prototypes, which are only used to show and explain the functions and usage of the present application. The looks appearing in actual products will be more diverse in form, action, style, size and color, and can be changed according to specific design requirements (such as IP authorization). In the future, with the increasing number of modeling modules, the user can be provided with almost unlimited possibilities for combination.

In this embodiment, the back plate 2 is a ferromagnetic metal plate, which is light and thin, has good deformability and can be arranged between the outer case 12 and the inner case 11. The modeling module is a light and thin (with a thickness less than 2 mm) magnetic attraction sheet. According to different design requirements, there are two choices for the material of the magnetic attraction sheet: a relatively hard neodymium magnet sheet or a relatively soft, elastic and flexible rubber soft magnetic sheet composed of magnetic powder and natural rubber powder, so that it can be overlapped and attracted on the back plate 2. In this way, the modeling module can be firmly and conveniently attracted on the back plate 2, and can also be conveniently detached to design a new look.

The size and shape of the case body 1 and the back plate 2 are adapted to phones of different appearance (especially phone devices with different camera shapes), so as to meet the needs of the user having different phone models. The back plate 2 has three purposes: 1. to provide a background (the pattern printed on the front surface of the back plate 2), so as to enhance the situational sense of the look; 2. to facilitate the storage and replacement of the design by the user (the user can remove the design attracted on the back plate 2, replace it with another back plate 2 for design, and can change back to the previous back plate 2 and design at any time); and 3. to enable some phone models with insufficient magnetic attraction on the rear surface to have sufficient attraction. The users can further give their designed back plate 2 as a gift to other users, or exchange it with other users to obtain the modeling modules they like or lack. For some specific phone models and corresponding phone cases (such as one-piece phone cases), if the back surface of the phone can provide sufficient magnetic attraction, the back plate is not necessary.

In this embodiment, both the outer case 12 and the inner case 11 are transparent plastic cases. Therefore, the whole case body 1 is a transparent plastic case, which has good shock absorption effect on the one hand and facilitates overall processing on the other hand. The outer case 12 and the inner case 11 are both back-cover cases (that is, the front side of the case is open, and the case body is covered on the rear side and the periphery of the phone). Each of the outer case 12 and the inner case 11 is provided with a window corresponding to a phone camera in position. Each of the outer case 12 and the inner case 11 is provided with a side opening or a thin film structure (referring to a structure with small thickness, which facilitates transmitting the pressing force of a finger) corresponding to a side button of the phone in position. Each of the outer case 12 and the inner case 11 is provided with an insertion hole corresponding to a charging port of the phone in position. Each of the outer case 12 and the inner case 11 is provided with a sound hole corresponding to a speaker of the phone in position. In fact, the case body 1 composed of the outer case 12 and the inner case 11 is essentially a flip case, which can theoretically have all the structures and functions of the existing phone cases (such as having a good appearance and hand feeling, providing reliable shockproof protection for the screen and the camera of the phone), and can protect the modular modeling component 3 covered under the phone case.

In this embodiment, a pair of magnetic attraction structures is arranged on a side of the outer case 12 and a side of the inner case 11 opposite to the rotating shaft 13, so that the outer case 12 can be opened and closed more conveniently, which extremely facilitates replacing the back plate 2 (mainly for changing the look of the rear side of the back plate 2). Specifically, the pair of magnetic attraction structures is a magnetic strip 15 and an iron strip 16, the magnetic strip 15 is arranged on one of the outer case 12 and the inner case 11, and the iron strip 16 is arranged on the other of the outer case 12 and the inner case 11, and the magnetic strip 15 is opposite in position to the iron strip 16. The strip-shaped (the magnetic strip 15 and the iron strip 16 are strip-shaped) magnetic attraction structures do not affect the aesthetics of a side surface of the phone case.

In this embodiment, the number of the pressing column 14 is four, and the four pressing columns 14 are distributed at four corners of the outer case 12, so that the back plate 2 is fixed more stably. It should be pointed out that the number of the pressing columns 14 is not limited to four, and the multiple pressing columns 14 are distributed along an edge of the back plate 2, so that the pressing columns can press the back plate 2 without pressing the modeling modules attracted on the back plate 2. The pressing columns 14 may be cylinders or prisms (such as hexagonal prisms). In an alternative solution of this embodiment, the pressing columns 14 are elastic telescopic columns (telescopic rods or telescopic columns with an internal spring), and the back plate 2 can be pressed by the elastic telescopic columns, which can adapt to the back plate 2 of a different thickness.

Second Embodiment

Another modular individualized phone case is provided in a second embodiment, which includes a case body 1, a back plate 2 and a modular modeling component 3. The back plate 2 and the modular modeling component 3 are the same as those in the first embodiment, and the difference lies in the case body 1. Therefore, the case body 1 of the second embodiment, that is different from that of the first embodiment, is mainly described in the following.

Figure 8:
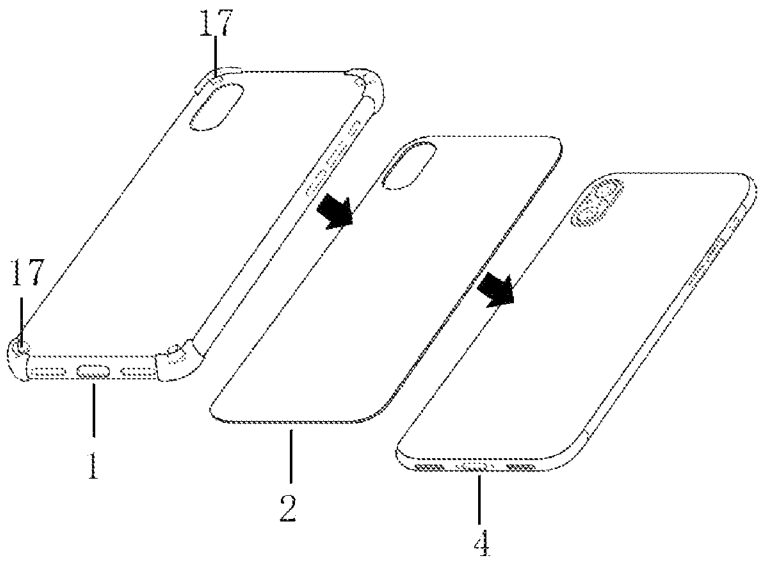
FIG. 8 is a schematic structural view of a case body of another modular individualized phone case in a second embodiment.
Figure 9:
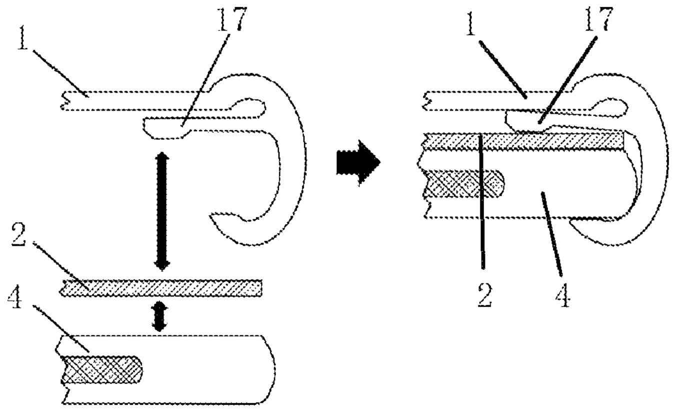
FIG. 9 is a schematic view showing an assembly process of the second modular individualized phone case in the second embodiment (illustrated with a cross-sectional view)
Figure 10:
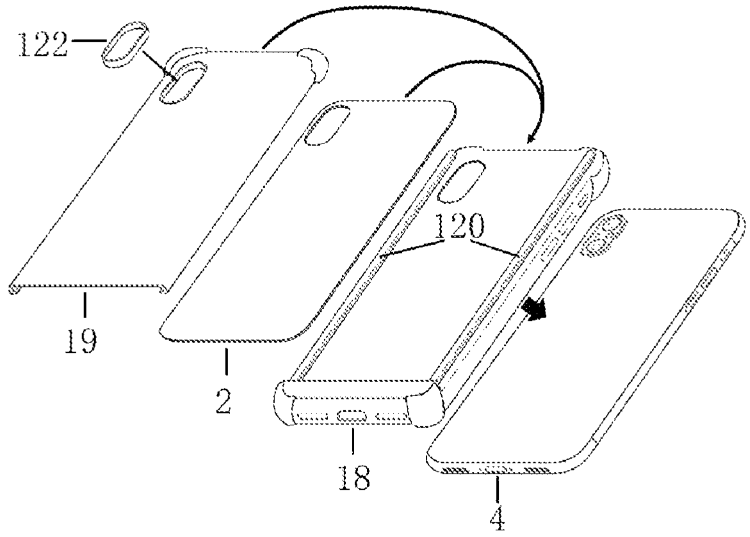
FIG. 10 is a schematic structural view of a case body of a third modular individualized phone case in a third embodiment.
Figure 11:
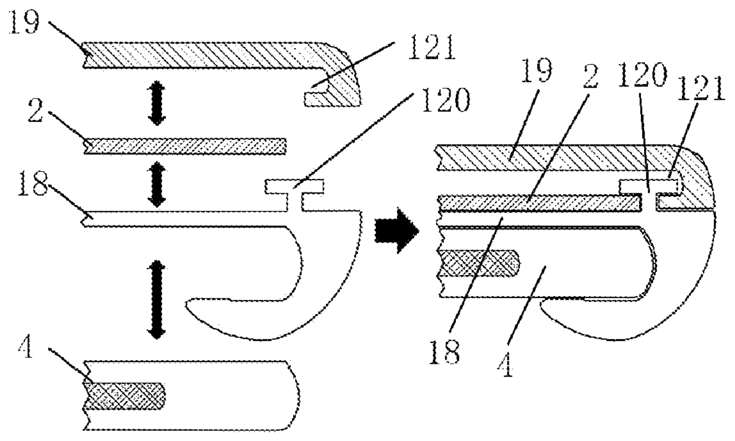
FIG. 11 is a schematic view showing an assembly process of the third modular individualized phone case in the third embodiment (illustrated with a cross-sectional view)
Figure 12:
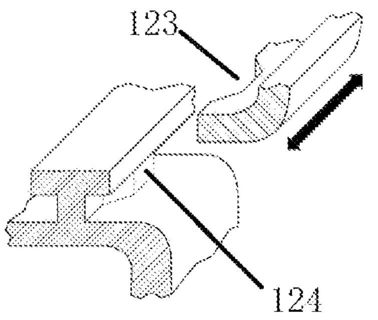
FIG. 12 is a partially schematic view of the case body of the third modular individualized phone case in the third embodiment (mainly showing a locking structure with a cross-sectional view)
Figure 13:
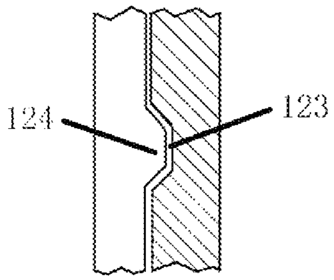
FIG. 13 is a schematic view showing a locked state of the locking structure in FIG. 12.

As shown in FIG. 8 and FIG. 9, the case body 1 is a one-piece case body, an elastic bracket 17 is provided in the case body 1, one end of the bracket 17 is connected with a side of the case body 1, and the other end is parallel to a bottom plate of the case body 1 and extends inward. When the phone case is fixed to a phone 4, the back plate 2 is clamped between the bracket 17 and the phone 4, and the modeling modules are located between the back plate 2 and the bottom plate of the case body 1. The one-piece case body can be formed by injection molding, with a simple structure and a low cost. A second type of case body is provided, which increases the options of the user.

In this embodiment, the number of the bracket 17 is four, and the four brackets 17 are distributed at four corners of the case body, which can fix the back plate more stably.

Third Embodiment

A third modular individualized phone case is provided in a third embodiment, which includes a case body 1, a back plate 2 and a modular modeling component 3. The back plate 2 and the modular modeling component 3 are the same as those in the first embodiment, and the difference lies in the case body 1. Therefore, the case body 1 of the third embodiment, that is different from that of the first embodiment, is mainly described in the following.

As shown in FIG. 10 to FIG. 13, the case body 1 is a slide case body, which includes a case main body 18 and a sliding cover 19. Two T-shaped sliding rails 120 which are parallel to each other and spaced apart are provided on a rear side of the case main body 18. A sliding groove 121 adapted to the T-shaped sliding rail 120 is defined on each of two sides of the sliding cover 19. The back plate 2 is clamped between inner rail grooves of the two T-shaped sliding rails 120 and is located in a cavity between the case main body 18 and the sliding cover 19. A third type of case body 1 is provided, which increases the options of the user.

In this embodiment, each of the case main body 18, the sliding cover 19 and the back plate 2 is provided with a window corresponding to a phone camera in position. An integrally formed annular sealing member 122 is arranged at the window of the sliding cover 19, and the other end of the annular sealing member 122 extends toward the case main body 18. When the sliding cover 19 and the back plate 2 are mounted on the case main body 18, the other end of the annular sealing member 122 seals the window of the case main body 18, so as to prevent dust and the like from entering the interlayer between the case main body 18 and the sliding cover 19, and enable the camera to work normally without obstruction. Before the sliding cover 19 is closed, the back plate 2 is placed at the front side of the sliding cover 19, and the annular sealing member 122 integrated with the sliding cover 19 passes through the window of the back plate 2. During sliding, the annular sealing member 122 is deformed after contacting the case main body 18. When the sliding cover 19 slides in place, the annular sealing member 122 is opposite to the window of the case main body 18, and the other end of the annular sealing member 122 extends into the window of the case main body 18, thus realizing the function of sealing the interlayer.

In this embodiment, a locking structure is provided between each T-shaped sliding rail 120 and the corresponding sliding groove 121. For example, a recess 123 is defined on the T-shaped sliding rail 120, and a corresponding protrusion 124 is provided at an edge of the sliding groove 121. Alternatively, a recess 123 is defined at an edge of the sliding groove 121, and a corresponding protrusion 124 is provided on the T-shaped sliding rail 120. When the sliding cover 19 slides in place with respect to the case main body 18, the locking structure is just locked, so as to prevent the sliding cover 19 from disengaging and falling off from the case main body 18.

Fourth Embodiment

A fourth modular individualized phone case is provided in a fourth embodiment, which includes a case body 1, a back plate 2 and a modular modeling component 3. The back plate 2 and the modular modeling component 3 are the same as those in the first embodiment, and the difference lies in the case body 1. Therefore, the case body 1 of the fourth embodiment, that is different from that of the first embodiment, is mainly described in the following.

Figure 14:
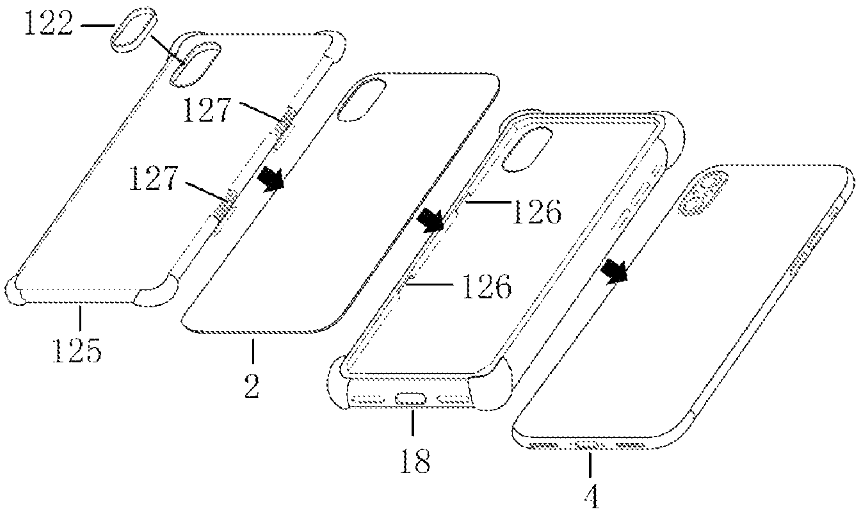
FIG. 14 is a schematic structural view of a case body of a fourth modular individualized phone case in a fourth embodiment.
Figure 15:
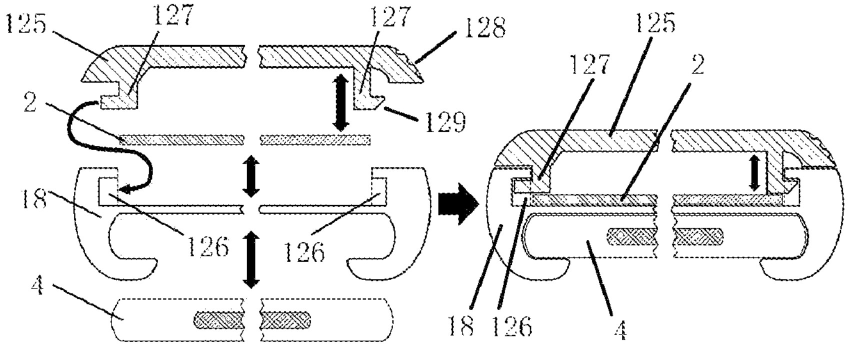
FIG. 15 is a schematic view showing an assembly process of the fourth modular individualized phone case in the fourth embodiment (illustrated with a cross-sectional view).

As shown in FIG. 14 and FIG. 15, the case body 1 is a snap-on case body, which includes a case main body 18 and a snap-on cover 125. Amounting cavity is defined on a rear side of the case main body 18, and a clamping groove 126 is defined on a side portion of the mounting cavity. A hook 127 which extends forward and is adapted to the clamping groove 126 is provided at an edge of the snap-on cover 125. The back plate 2 is arranged in the mounting cavity, and the back plate 2 is pressed against the bottom of the mounting cavity by the top of the hook 127. A fourth type of case body 1 is provided, which increases the options of the user.

In this embodiment, two clamping grooves 126 are defined on each of a left side and a right side of the mounting cavity, two hooks 127 are provided on each of two sides of the snap-on cover 125, and the four hooks 127 are in one-to-one correspondence with the four clamping grooves 126, so that the fixing effect is better. The two hooks 127 on the same side form a group, so there are two groups of hooks 127, and the shapes and functions of the two groups of hooks 127 are different. One group (referring to that on the same side) of the hooks 127 has a rigid structure with no elasticity. The other group (referring to that on the other side) of the hooks 127 is elastic, and the hooks 127 can be released by pushing a button 128 to disengage from the clamping groove 126, so that the snap-on cover 125 can be removed. The process of fastening the snap-on cover 125 to the case main body 18 is as follows: firstly, the hooks 127 with the rigid structure are embedded into the clamping grooves 126, and then the other side of the snap-on cover 125 is pressed. Since each hook 127 on the other side has a triangular guiding structure 129 and is elastic, the hook 127 can be pressed into and stuck in the clamping groove 126.

In this embodiment, each of the case main body 18, the snap-on cover 125 and the back plate 2 is provided with a window corresponding to a phone camera in position. An integrally formed annular sealing member 122 is arranged at the window of the snap-on cover 125, and the other end of the annular sealing member 122 extends toward the case main body 18. When the snap-on cover 125 and the back plate 2 are mounted on the case main body 18, the other end of the annular sealing member 122 seals the window of the case main body 18, so as to prevent dust and the like from entering the interlayer between the case main body 18 and the snap-on cover 125, and enable the camera to work normally without obstruction. Before the snap-on cover 125 is closed, the back plate 2 is placed at the front side of the snap-on cover 125, and the annular sealing member 122 passes through the window of the back plate 2. After the snap-on cover is closed, the annular sealing member 122 passes through the window of the case main body 18, thereby realizing the function of sealing the interlayer.

Although the present application has been described in detail above with general descriptions and specific embodiments, some modifications or improvements can be made thereto on the basis of the present application, which are obvious to those skilled in the art. Therefore, these modifications or improvements made without departing from the spirit of the present application belong to the protection scope of the present application.

What is claimed is:

1. A modular individualized phone case, comprising:

a case body;

a modular modeling component, wherein the modular modeling component comprises a plurality of modeling modules which are configured to be combined to form different looks; and a back plate, wherein the back plate is detachably arranged in the case body, the back plate is a ferromagnetic metal plate, and the modular modeling component is attracted and fixed onto a rear side surface of the back plate, and the modeling modules are magnetic attraction sheets, wherein the case body is a snap-on case body, which comprises a case main body and a snap-on cover, wherein a mounting cavity is defined on a rear side of the case main body, and a clamping groove is defined on a side portion of the mounting cavity, wherein a hook which extends forward and is adapted to the clamping groove is provided at an edge of the snap-on cover, the back plate is arranged in the mounting cavity, and the back plate is pressed against the bottom of the mounting cavity by the top of the hook, wherein two clamping grooves are defined on each of a left side and a right side of the mounting cavity, two hooks are provided on each of two sides of the snap-on cover, and the four hooks are in one-to-one correspondence with the four clamping grooves; each of the case main body, the snap-on cover and the back plate is provided with a window corresponding to a phone camera in position, wherein an integrally formed annular sealing member is arranged at the window of the snap-on cover, and when the snap-on cover and the back plate are mounted on the case main body, the other end of the annular sealing member seals the window of the case main body.

2. A modular individualized phone case, comprising:

a case body;

a modular modeling component, wherein the modular modeling component comprises a plurality of modeling modules which are configured to be combined to form different looks; and a back plate, wherein the back plate is detachably arranged in the case body, the back plate is a ferromagnetic metal plate, and the modular modeling component is attracted and fixed onto a rear side surface of the back plate, and the modeling modules are magnetic attraction sheets, wherein the case body is a flip case body, which comprises an outer case and an inner case, wherein the outer case is a transparent case, and the inner case is arranged inside the outer case, wherein a side of the inner case is pivotally connected to a same side of the outer case by a rotating shaft, wherein a front side of a bottom plate of the outer case is provided with an elastic pressing column, wherein the back plate is arranged in an interlayer between the outer case and the inner case and is pressed against a rear side of the inner case by the pressing column, and the modeling modules are located between the back plate and the outer case.

3. The modular individualized phone case according to claim 2, wherein both the outer case and the inner case are transparent plastic cases, a pair of magnetic attraction structures is arranged on a side of the outer case and a side of the inner case opposite to the rotating shaft; the pair of magnetic attraction structures is a magnetic strip and an iron strip, the magnetic strip is arranged on one of the outer case and the inner case, and the iron strip is arranged on the other of the outer case and the inner case, and the magnetic strip is opposite in position to the iron strip; the number of the pressing column is four, and the four pressing columns are distributed at four corners of the outer case.

4. A modular individualized phone case, comprising:

a case body;

a modular modeling component, wherein the modular modeling component comprises a plurality of modeling modules which are configured to be combined to form different looks; and a back plate, wherein the back plate is detachably arranged in the case body, the back plate is a ferromagnetic metal plate, and the modular modeling component is attracted and fixed onto a rear side surface of the back plate, and the modeling modules are magnetic attraction sheets, wherein the case body is a slide case body, which comprises a case main body and a sliding cover, wherein two T-shaped sliding rails which are parallel to each other and spaced apart are provided on a rear side of the case main body, wherein a sliding groove adapted to the T-shaped sliding rail is defined on each of two sides of the sliding cover, wherein the back plate is clamped between the two T-shaped sliding rails and is located in a cavity between the case main body and the sliding cover.

5. The modular individualized phone case according to claim 4, wherein each of the case main body, the sliding cover and the back plate is provided with a window corresponding to a phone camera in position, wherein an integrally formed annular sealing member is arranged at the window of the sliding cover, and when the sliding cover and the back plate are mounted on the case main body, the other end of the annular sealing member seals the window of the case main body; a locking structure is provided between each T-shaped sliding rail and the corresponding sliding groove.

* * * * *